(12) United States Patent
Sullivan et al.

(10) Patent No.: US 10,549,659 B2
(45) Date of Patent: Feb. 4, 2020

(54) SEATING ARRANGEMENTS IN A VEHICLE

(71) Applicant: Toyota Motor Engineering & Manufacturing North America, Inc., Erlanger, KY (US)

(72) Inventors: Richard M. Sullivan, Canton, MI (US); Danil V. Prokhorov, Canton, MI (US); Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 245 days.

(21) Appl. No.: 15/656,028

(22) Filed: Jul. 21, 2017

(65) Prior Publication Data

US 2019/0023161 A1    Jan. 24, 2019

(51) Int. Cl.
*B60N 2/50* (2006.01)
*B60N 2/10* (2006.01)
*B60N 2/02* (2006.01)

(52) U.S. Cl.
CPC .......... *B60N 2/501* (2013.01); *B60N 2/0244* (2013.01); *B60N 2/10* (2013.01); *B60N 2002/0264* (2013.01); *B60Y 2400/404* (2013.01)

(58) Field of Classification Search
CPC ........ B60N 2/501; B60N 2/0244; B60N 2/10; B60N 2002/0264; B60Y 2400/404
See application file for complete search history.

(56) References Cited

U.S. PATENT DOCUMENTS

| 7,224,252 | B2 * | 5/2007 | Meadow, Jr. .... A63B 21/00192 104/281 |
| 2003/0168574 | A1 | 9/2003 | Watanabe et al. |
| 2018/0265136 | A1 * | 9/2018 | Baccouche ............ B60J 5/0479 |

FOREIGN PATENT DOCUMENTS

| KR | 20030083143 A | 10/2003 |
| KR | 101466498 B1 | 12/2014 |

* cited by examiner

*Primary Examiner* — Alan D Hutchinson
(74) *Attorney, Agent, or Firm* — Christopher G. Darrow; Darrow Mustafa PC (57) ABSTRACT

Various seating arrangements for a vehicle are described. Generally, the vehicle includes an electromagnetic array featured on a floor of the vehicle. The chair includes base having a plurality of magnets featured thereon. The vehicle generates signals for the electromagnetic array to generate a wave and impart a force on the chair in a determined direction via the plurality of magnets.

20 Claims, 6 Drawing Sheets

SEATING ARRANGEMENTS IN A VEHICLE

TECHNICAL FIELD

The present disclosure generally relates to seating and, more particularly, to seating arrangements in a vehicle.

BACKGROUND

Many vehicles, such as recreational vehicles, currently have furniture that includes a human support surface (e.g., beds, couches, chairs, etc.) that an occupant can sit and/or lay on to occupy the furniture. However, the furniture is typically affixed to one or more surfaces (e.g., the floor and/or one or more walls) of the vehicle. Where the furniture is affixed to the vehicle, the owner of the vehicle and/or an occupant of the furniture cannot relocate the furniture within the vehicle without having to detach the furniture, move the furniture to the desired position, and reattach the furniture to the vehicle.

Additionally, where the furniture is affixed to the vehicle, when a person is occupying the furniture, and the vehicle experiences accelerations as a result of one or more maneuvers of the vehicle, the person may shift position because of changes in their inertia, and may be disturbed as a result. This can be problematic, particularly where an occupant of the furniture is performing any sort of task that requires attention to detail and/or fine motor skills.

SUMMARY

Seating arrangements in a vehicle are disclosed herein. Generally, the vehicle includes an electromagnetic array featured on a floor of the vehicle. The chair includes a base having a plurality of magnets featured thereon. The vehicle generates signals for the plurality of electromagnets to generate a wave and impart a force on the chair. Such systems can move the chair freely about the inside of the vehicle, and can also maintain the position of the chair within the vehicle, if desired.

One example includes a seating system in a vehicle. The seating system can include a floor featuring an electromagnetic array configured to output a magnetic field having a first polarity. The seating system can include a chair including a base adjacent to the floor, the base featuring one or more magnets configured to have a shared second polarity that is opposite the first polarity. The seating system can include a processor operatively connected to the electromagnetic array. The seating system can also include memory operatively connected to the processor. The memory can store an array control module including instructions that, when executed by the processor, cause the processor to determine where to direct a wave in the magnetic field to impart a force on the chair in a determined direction. The array control module can also include instructions that, when executed by the processor, cause the processor to generate one or more control signals for the electromagnetic array to produce a wave in the magnetic field that moves across the electromagnetic array in the determined direction and thereby imparts the force on the chair via the one or more magnets in the determined direction.

Another example includes a method of controlling a chair in a vehicle. The method can be performed in a vehicle including a chair and a floor featuring an electromagnetic array. The method can include levitating the chair above the electromagnetic array using a magnetic field output by the electromagnetic array. The method can also include identifying a target destination for the chair within the vehicle. The method can also include generating one or more waves in the magnetic field, the one or more waves moving towards the target destination, thereby imparting a force on the chair causing the chair to be located at the target destination.

DETAILED DESCRIPTION

This disclosure teaches seating arrangements in a vehicle. The vehicle includes a floor featuring an array of electromagnets outputting a magnetic field. Also, a chair includes a base featuring a plurality of magnets. The vehicle generates signals for the electromagnetic array to produce a wave in the magnetic field and thereby imparting a force on the chair in a determined direction.

Figure 1:
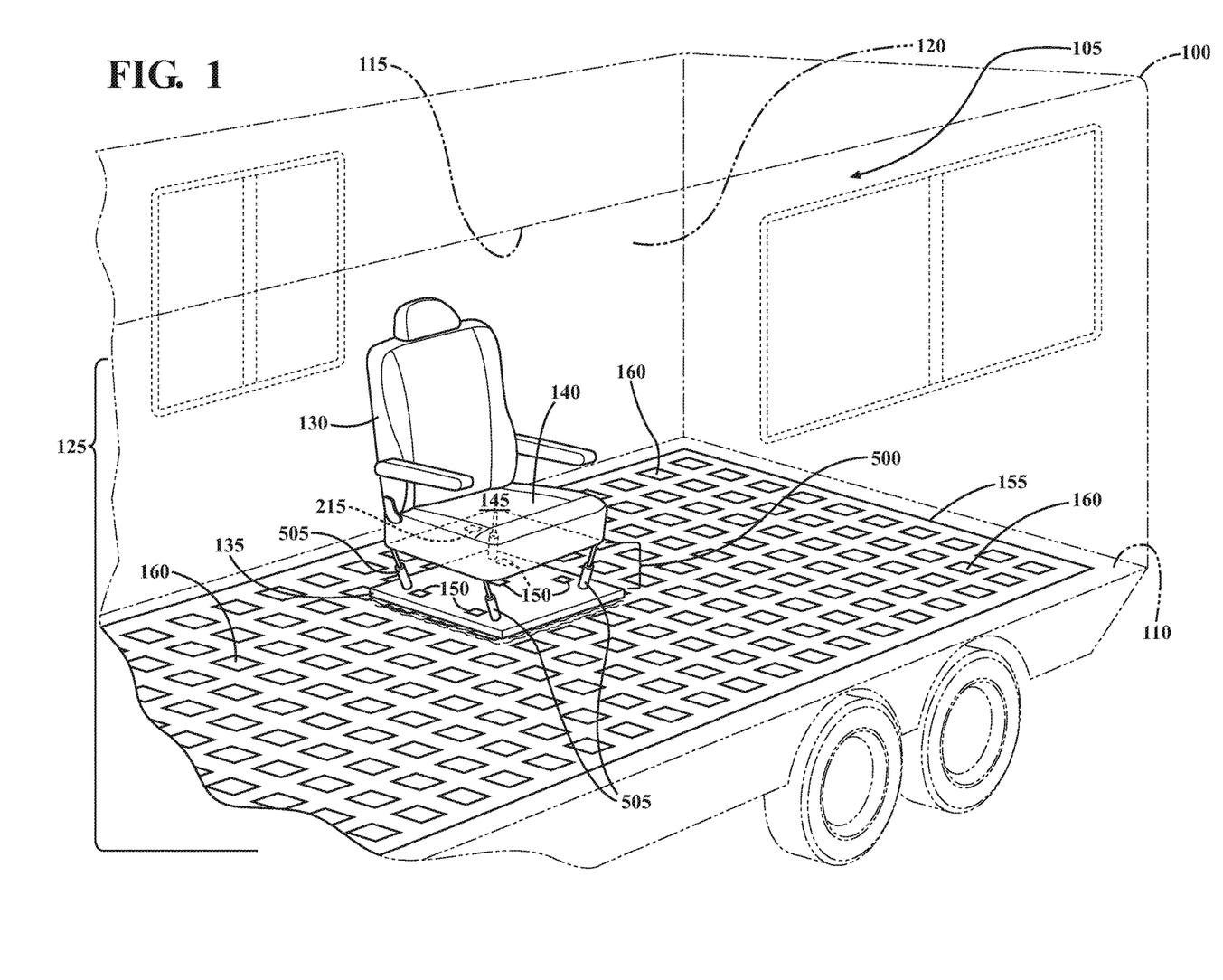
FIG. 1 shows a seating system in a vehicle including an electromagnetic array outputting a magnetic field, and a chair that is levitating above the electromagnetic array.

Referring to FIG. 1, a portion of a representative vehicle 100 shown in phantom. In this description, uses of "front," "forward" and the like, and uses of "rear," "rearward" and the like, refer to the longitudinal direction of the vehicle 100. "Front," "forward" and the like refer to the front (fore) of the vehicle 100, while "rear," "rearward" and the like refer to the back (aft) of the vehicle 100. Similarly, uses of "left," right," "sides" and the like refer to the transverse direction of the vehicle 100. "Left," or similar terms, refers to the left side (port) of the vehicle 100, while "right," or other similar terms, refers to the right side (starboard) of the vehicle 100.

In one or more arrangements, the vehicle 100 is a recreational vehicle. However, in other arrangements, the vehicle 100 can also be a sport utility vehicle (SUV), semi-truck, or other form of automobile. While arrangements will be described herein with respect to automobiles, it will be understood that examples disclosed herein are not limited to automobiles. To the contrary, the examples disclosed herein can include any other type of vehicle that can benefit from the disclosed systems and methods (e.g., trains, watercraft, etc.).

The vehicle 100 includes an interior portion 105 (or passenger compartment). The interior portion 105 can have surfaces, such as a floor 110, a ceiling 115, walls 120 (left side walls, right side walls, rear walls), etc., which can define the interior portion 105. In some arrangements, the vehicle 100 can include one or more other walls, such as interior walls, that separate regions (or rooms) within the vehicle 100.

The vehicle 100 can include a seating system 125. The seating system 125 can include furniture. In some arrangements, the furniture can be a chair 130. However, while described herein as a chair, the present disclosure is not limited to a chair, and can include other furniture including, but not limited to, sofas, beds, couches, etc. Additionally or alternatively, the furniture can be a two or more furniture pieces that are grouped together (e.g., a plurality of chairs, a chair and a table or desk, for example). The chair 130 can include a base 135 and a seat 140. As will be discussed in greater detail below, the base 135 can be a portion of the chair 130 operative to support or maintain the chair 130 in an upright position. The seat 140 can include a human support surface 145 that is upwardly facing. The human support surface 145 can be a portion of the chair 130 operative to support an occupant of the vehicle 100 that is seated on the chair 130.

The base 135 can include one or more magnets 150. In some arrangements, the magnets 150 can be permanent magnets. In other arrangements, the magnets 150 can be electromagnets. In arrangements where the magnets 150 are electromagnets, the electromagnets can be operatively connected to one or more other components of the vehicle 100 (such as the processor(s) 200 of FIG. 2) and can be controlled thereby. The magnets 150 can be arranged about a perimeter of the base 135. The magnets 150 can be positioned on an underside of the base 135 proximate to the floor 110. In some examples, magnets 150 can be positioned on the corners, sides, center, etc. of the base 135. The magnets 150 can be arranged to each have the same polarity as one another. Each of the magnets 150 can output an individual magnetic field. The individual magnetic fields can extend, at least in part, downwardly from the chair 130. In this regard, each of individual magnetic fields can be combined to output a magnetic field that is directed from the chair 130 towards the floor 110 of the vehicle 100 when the chair 130 is in an upright position.

The seating system 125 can also include an electromagnetic array 155. The electromagnetic array 155 can be featured on the floor 110 of the vehicle 100. In some arrangements, the electromagnetic array 155 can be incorporated into the floor 110 of the vehicle 100. In other arrangements, the electromagnetic array 155 can be positioned on top of the floor 110 of the vehicle 100. The electromagnetic array 155 can include a plurality of electromagnets 160 that are operatively connected to processor(s) 200 of the vehicle 100. Each of the plurality of electromagnets 160 can be controlled to output an adjustable magnetic field. Each magnetic field can be adjustable in that various characteristics and/or parameters of the magnetic field can be changed including, but not limited to, the magnetic field strength, polarity, frequency, etc. Further, each adjustable magnetic field can be combined to result in a magnetic field across the electromagnetic array 155. As a result, the magnetic field across the electromagnetic array 155 may have an adjustable profile. "Profile," as used herein, is an outline, or defining contour. In this regard, the magnetic field across the electromagnetic array 155 may have a defining contour that is adjustable. In some arrangements, the electromagnetic array 155 can output a magnetic field that has a uniform polarity. The uniform polarity may be the opposite polarity as the polarity of the magnets 150 arranged on the base 135 of the chair 130 (e.g., like poles on respective magnets are facing one another). In this regard, the magnets 150 arranged on the base 135 of the chair 130 may be repulsed by the magnetic field of the electromagnetic array 155. While described as a uniform polarity, it is noted that the magnetic field of the electromagnetic array 155 may not have a uniform magnetic field strength. In some examples, the magnetic field strength may be reduced in portions of the electromagnetic array 155, such as portions of the electromagnetic array 155 where the chair 130 is not located. Such arrangements may, for example, reduce power consumption from the electromagnetic array 155.

The magnets 150 arranged on the base 135 of the chair 130 and the electromagnets 160 can have sufficient magnetic field strength to, at least, cause the chair 130 to levitate. This phenomenon is generally known as magnetic levitation. In other arrangements, a portion of the electromagnetic array 155 can be controlled to output a magnetic field that has the same polarity as the polarity of the magnets 150 arranged on the base 135 of the chair 130 (e.g., opposite poles on respective magnets are facing one another). In this regard, the magnets 150 arranged on the base 135 of the chair 130 may be attracted to the magnetic field of the portion of the electromagnetic array 155, thereby causing the chair 130 be magnetically attached to the floor 110.

As stated, the electromagnetic array 155 can include a plurality of electromagnets 160. Each of the electromagnets 160 in the electromagnetic array 155 can provide feedback to one or more other components of the vehicle 100 (e.g., the processor(s) 200, for example). The size, number, strength, etc. of electromagnets 160 in the electromagnetic array 155 may be selected based on a number of factors including, but not limited to, application, typical chair occupant size, weight of the vehicle 100, power consumption, levitation height desired, granularity in movement, etc. In some arrangements, the electromagnets 160 may be (or operate similar to) linear induction motors.

Figure 2:
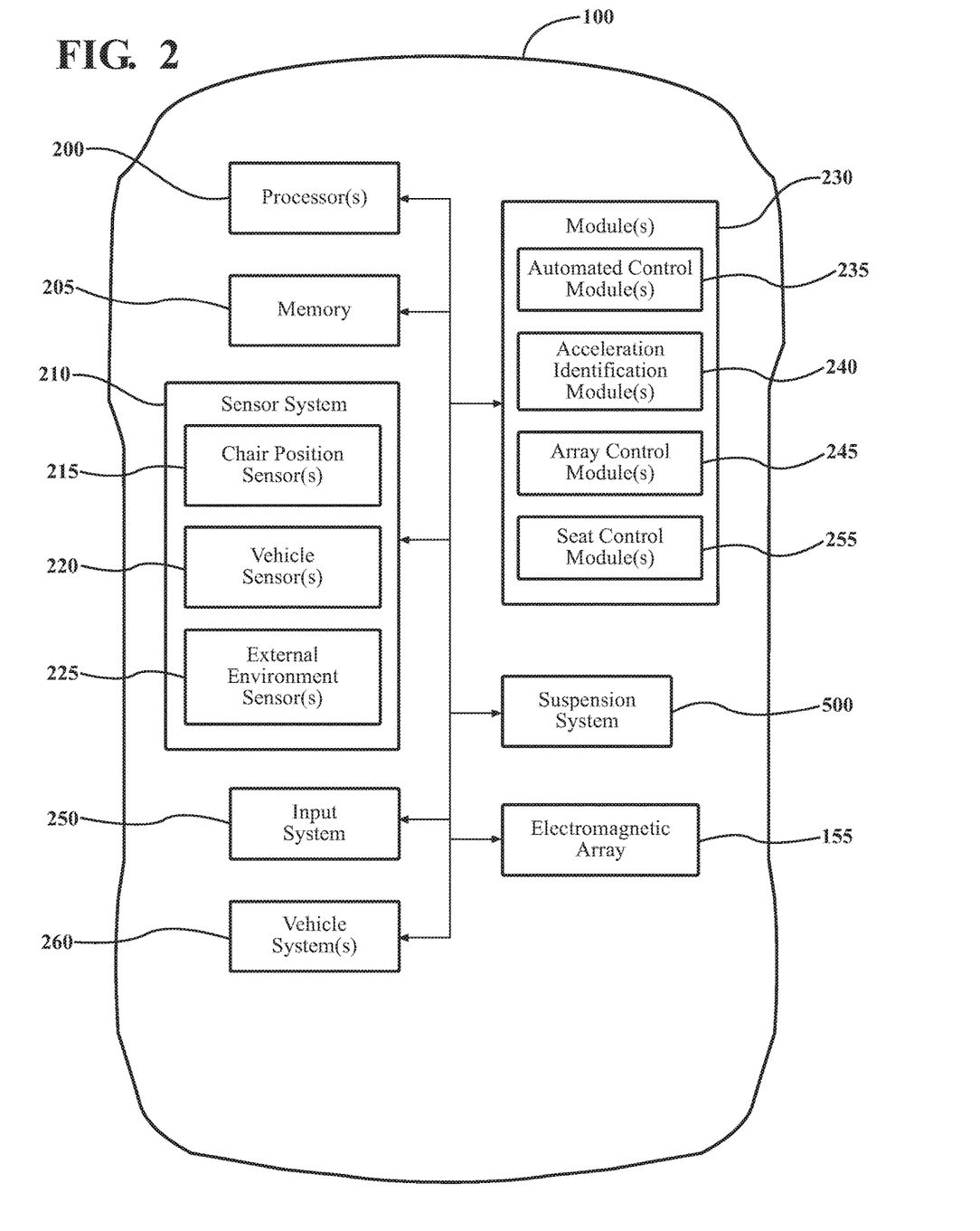
FIG. 2 shows a schematic view of the vehicle of FIG. 1.

Referring now to FIG. 1 and FIG. 2, the vehicle 100 can include one or more processors 200. The processor(s) 200 are configured to implement or perform various functions described herein. In one or more arrangements, the processor(s) 200 can be a main processor of the vehicle 100. For instance, the processor(s) 200 can be an electronic control unit (ECU). The vehicle 100 can also include memory 205 for storing one or more types of data. The memory 205 can be a component of the processor(s) 200, or the memory 205 can be operatively connected to the processor(s) 200 for use thereby. The term "operatively connected," as used throughout this description, can include direct or indirect connections, including connections without direct physical contact.

The vehicle 100 can include a sensor system 210. The sensor system 210 can include one or more sensors. As will be described in greater detail below, the sensor system 210 can include chair position sensor(s) 215, vehicle sensor(s) 220, external environment sensor(s) 225, etc. Generally, the chair position sensor(s) 215 can be any component or group of components operable to detect and/or assess the position and/or orientation of the chair 130 within the vehicle 100. The vehicle sensor(s) 220 can be any component or group of components operable to detect one or more conditions of the vehicle 100. The external environment sensor(s) 225 can be any component or group of components operable to detect one or more conditions of an environment within which the vehicle 100 currently operates. Each of the sensor(s) in the sensor system 210 can generate and/or acquire data to be used by other components of the vehicle 100 to, for example, perform various tasks or functions, as feedback while performing various tasks or functions, etc.

The memory 205 can include various instructions stored thereon. In one or more arrangements, the memory 205 can store one or more modules 230. While the module(s) 230 disclosed herein will be described in terms of functions for purposes of brevity, module(s) 230 can be or include computer-readable instructions that, when executed by the processor(s) 200, cause the processor(s) 200 to perform the described functions. Furthermore, while some module(s) 230 can be stored on memory 205, it is noted that various module(s) 230 can be stored on and/or be a component of the processor(s) 200, can be remotely stored and accessible by the processor(s) 200, etc.

The vehicle 100 can include one or more automated control modules 235. As will be discussed in greater detail below, the automated control module(s) 235 can include instructions that cause the processor(s) 200 to determine motion of the vehicle 100. For example, the automated control module(s) 235 can determine a speed of the vehicle 100, a rotation of the vehicle 100, a direction (e.g., heading) of the vehicle 100, etc.

The automated control module(s) 235 can identify one or more changes in motion (e.g., changes in speed, changes in rotation, changes in direction or heading, etc. of the vehicle 100). In one or more examples, the changes in motion may be caused by one or more objects in the external environment of the vehicle 100. In one or more examples, the changes in motion may be caused by changes to the roadway (e.g., road topology, number of lanes, speed limit, etc.). In one or more examples, the changes in motion may be caused by the vehicle 100 following a path to a destination, the path having one or more turns, lane changes, etc.

The automated control module(s) 235 can determine one or more driving maneuvers (e.g., brake, speed up, turn left or right, left or right lane changes, sway left or right, etc.) for implementing the one or more changes in motion. For example, the automated control module(s) 235 can include or otherwise access a database including a plurality of driving maneuvers that the vehicle 100 can perform. Each of the plurality of maneuvers can correspond to a change in motion. The automated control module(s) 235 can determine the driving maneuver that can implement or is otherwise associated with the change in motion. Any one of the driving maneuver(s) may cause the vehicle 100 to accelerate.

As will be discussed in greater detail below, the automated control module(s) 235 can generate one or more vehicle control signals that cause the vehicle 100 to execute the one or more driving maneuvers. While this example is described, it should be understood that the vehicle 100 can be controlled by a driver. In this example, the driver can cause the vehicle 100 to implement the one or more driving maneuvers.

Figure 5:
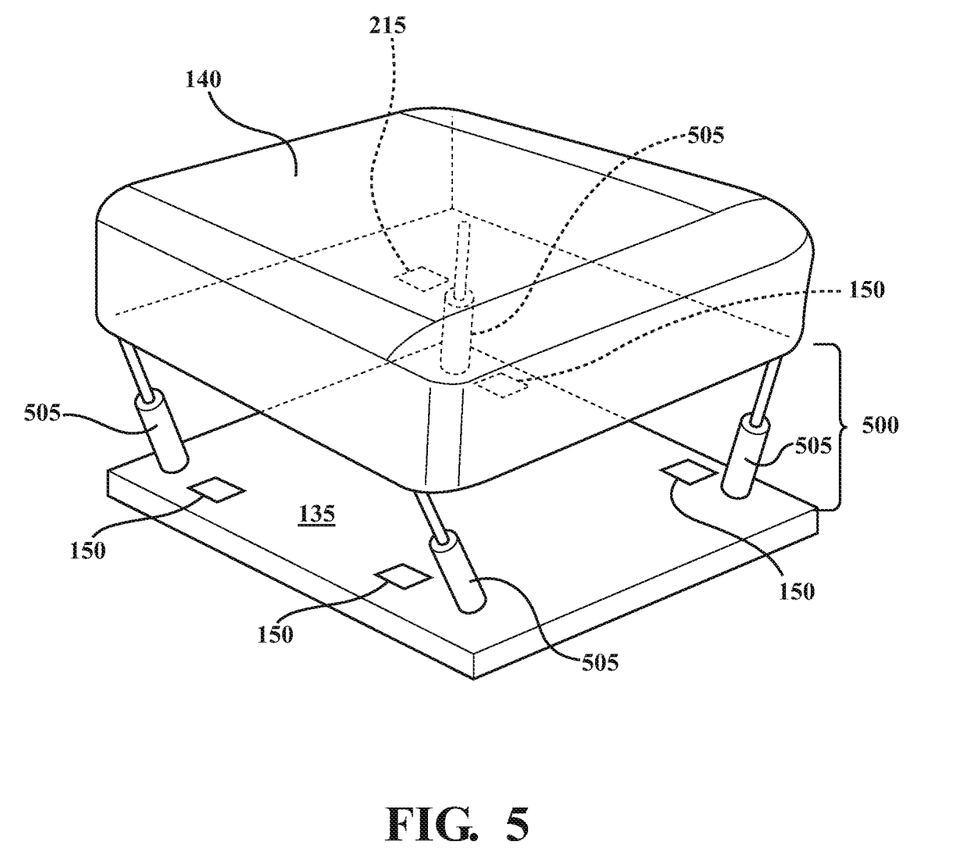
FIG. 5 shows a suspension system for a seat of the chair of FIG. 1.

When the vehicle 100 is caused to execute the one or more maneuvers, the chair 130 may accelerate within the vehicle 100. In some arrangements, the chair 130 may accelerate relative to the vehicle 100. This will particularly occur when the electromagnetic array 155 is being controlled to cause the chair 130 to levitate, since the chair 130 will have no frictional forces to hold the chair 130 in place within the vehicle 100. The acceleration may impart an inertial force on the chair 130. "Inertial force," as used throughout the present disclosure, refers to a fictitious force that is imparted on a body upon acceleration. The inertial force on the chair 130 may be a function of, at least, an acceleration vector (e.g., direction and magnitude of acceleration) for the chair 130. The inertial force is generally caused by the tendency of an object in motion (e.g., the chair 130) to maintain its heading and speed (e.g., according to Newton's first law). As will be discussed in greater detail below, such inertial forces can be countered by use of one or more array control modules 245 operable to produce waves in the magnetic field of the electromagnetic array 155 to impart a countering force on the chair 130 and/or a suspension system 500 operable to tilt the seat 140 of the chair 130.

In one or more arrangements, the vehicle 100 can include one or more acceleration identification modules 240. The acceleration identification module(s) 240 can include instructions to determine one or more accelerations resulting from executing each of the one or more maneuvers. In one or more arrangements, each maneuver may include a direction and a magnitude of acceleration. "Magnitude," as used herein, includes an amount and, with respect to acceleration, can refer to both positive and negative acceleration (e.g., deceleration). The direction of acceleration and magnitude of acceleration can form an acceleration vector for each maneuver.

As one example, a braking maneuver may have a "rear" direction of acceleration, and a magnitude that changes with changes in the vehicle 100 brake operation. As another example, a lateral maneuver (e.g., left/right turns, left/right lane changes, sway left/right, etc.) may have a left or right direction of acceleration, and a magnitude that changes with changes in the vehicle's 100 direction, yaw, roll, and/or pitch. As shown in both examples, any given maneuver includes a direction and a magnitude of acceleration, which can be combined to form an acceleration vector.

The acceleration identification module(s) 240 can include instructions to identify which maneuvers the vehicle 100 will execute and/or is executing, as well as acceleration(s) associated with the maneuvers. In one or more arrangements, the automated control module(s) 235 can include instructions to identify one or more maneuvers to execute, and the acceleration identification module(s) 240 can include instructions to identify acceleration(s) associated with the maneuvers determined via the automated control module(s) 235.

The acceleration identification module(s) 240 can include instructions to determine an acceleration vector for each of the one or more maneuvers. For two or more maneuvers (e.g., a series of maneuvers), the acceleration identification module(s) 240 can determine a first acceleration vector for the first maneuver, a second acceleration vector for the second maneuver, etc.

In one or more arrangements, the vehicle 100 can identify the accelerations via the vehicle sensor(s) 220 of the sensor system 210. In some arrangements, the vehicle sensor(s) 220 can include one or more acceleration sensors. The acceleration sensor(s) can be and/or include, for example, an accelerometer, an inertial measurement unit (IMU), a gyroscope, etc. and/or various combinations thereof. In this regard, the vehicle 100 can identify the accelerations as they are occurring. Additionally or alternatively, where the vehicle 100 identifies the accelerations via the acceleration identification module(s) 240 and/or some other method, the vehicle 100 can verify the identified accelerations via the acceleration sensor(s) of the sensor system 210. In this regard, the data captured and/or generated by the acceleration sensor(s) can be used as feedback by the acceleration identification module(s) 240.

Figure 3:
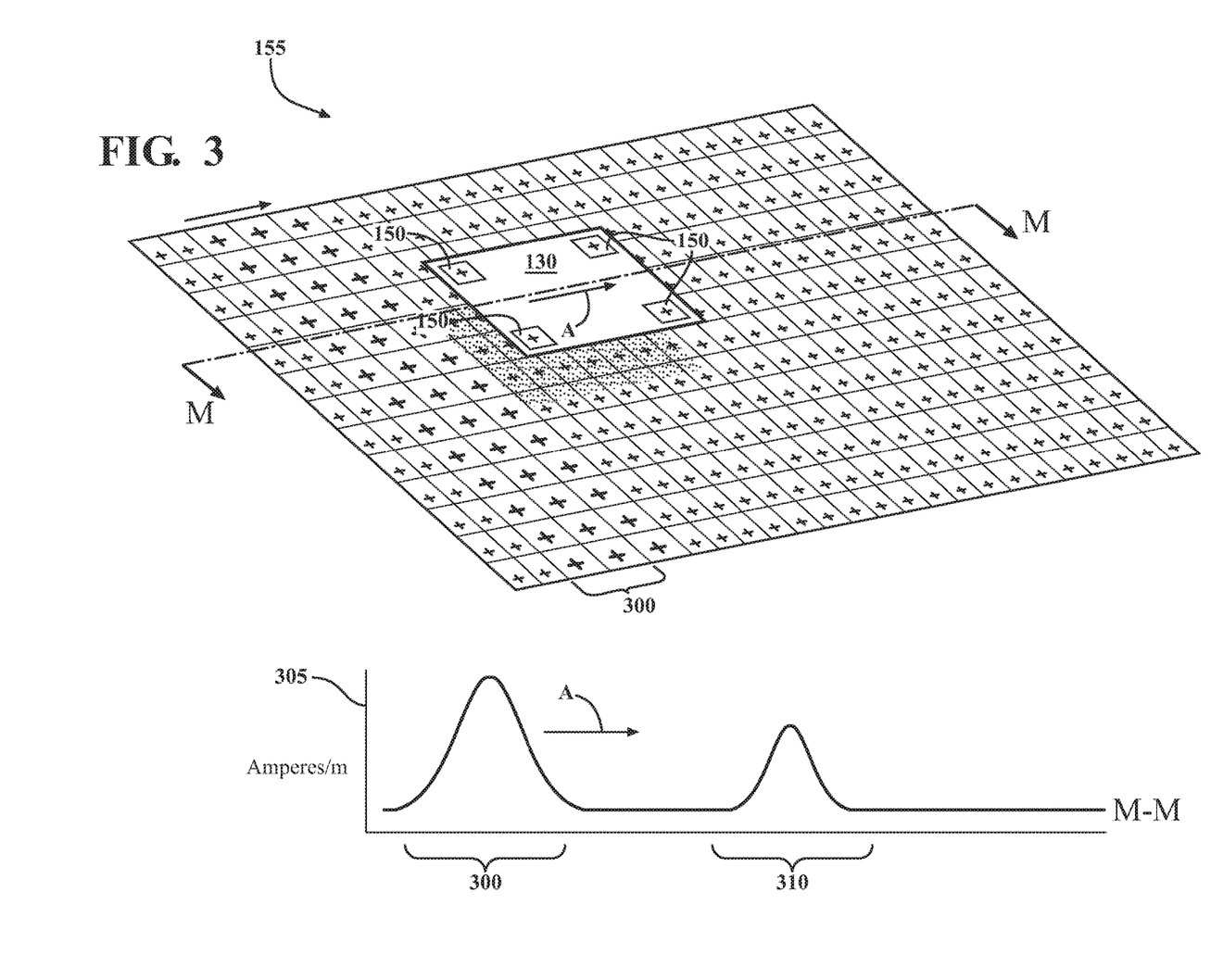
FIG. 3 and FIG. 4 show various waves produced in the magnetic field output by the electromagnetic array of FIG. 1.

Referring now to FIG. 2 and FIG. 3, the vehicle 100 can include one or more array control modules 245. The array control module(s) 245 can include instructions to determine where to direct a wave 300 in the magnetic field output by the electromagnetic array 155. The wave 300 in the magnetic field can impart a force on the chair 130. The force imparted on the chair 130 can cause the chair 130 to move in a direction, can counter a different force on the chair 130, etc. In this regard, the array control module(s) 245 can determine a direction to impart a force on the chair 130. The array control module(s) 245 can determine where to direct the wave in the magnetic field to impart a force on the chair 130 in the determined direction.

The array control module(s) 245 can include instructions to identify a target destination for the chair 130. The target destination may be a position and/or orientation for the chair 130 within the vehicle 100. The target destination may be a location that is set by the vehicle 100, an occupant, etc. The array control module(s) 245 can determine a direction to impart force on the chair 130 to move the chair 130 to the target destination. The array control module(s) 245 can produce one or more wave(s) in the electromagnetic array 155 that move across the electromagnetic array 155 towards the target destination. The wave(s) in the electromagnetic array 155 may move across the electromagnetic array 155 along the determined direction. As a result, the wave(s) may impart a force on the chair 130 in the determined direction, and cause the chair 130 to be located at the target destination.

Specifically, in FIG. 3, an example wave 300 is shown in the magnetic field moving in the direction indicated by the arrow A, with the wave 300 carrying the chair 130 and thereby moving the chair 130 in the direction indicated by the arrow A. The magnetic field output by the electromagnetic array 155 away from the floor 110 is represented by positive symbols (e.g., south poles facing upwards). In this regard, the magnetic field shown in FIG. 3 has a uniform polarity (e.g., all positive). Additionally, the magnetic field output by magnets 150 on the base of the chair 130 towards the floor 110 is represented by positive symbols (e.g., south poles facing downwards). While each of these magnetic fields are represented as all positive, the respective magnetic fields may have the opposite polarity (e.g., all negative polarity). Regardless, in the example shown in FIG. 3, respective like poles of the electromagnetic array 155 and the magnets 150 should be facing one another, thereby causing the chair 130 to levitate.

The control signal(s) for the electromagnetic array 155 can increase the magnetic field strength in particular areas, as represented by the graph 305. The graph 305 shows a profile of the magnetic field output by the electromagnetic array 155 defined by axis M-M. The control signal(s) can be transmitted from the processor(s) 200 to each of the electromagnets 160 in the electromagnetic array 155, thereby changing a profile of the magnetic field across the electromagnetic array 155. Specifically, and as shown in FIG. 3, the profile of the magnetic field includes the wave 300 (represented by increased size of the positive symbols). As the wave 300 travels in the direction indicated by the arrow A, the wave 300 imparts a force on the chair 130, via the magnets 150 positioned on the base 135, along the direction A. As such, the wave 300 will increase levitation of a portion of the chair 130. The wave 300 may move at a rate across the electromagnetic array 155. The rate that the wave 300 moves may be a function of the rate that the chair 130 is desired to move, and can be selected and/or determined according to various parameters and applications (e.g., force on the chair 130, acceleration vector from execution of a maneuver, etc.). As a result, the chair 130 will move with the wave 300.

When the chair 130 approaches (or is located at) the target destination, the array control module(s) 245 can generate one or more control signal(s) for the electromagnetic array 155 to produce a counter wave 310 in the magnetic field. The counter wave 310 may be produced similar to the wave 300 as previously described. In some arrangements, the array control module(s) 245 can produce the counter wave 310 and decrease the magnetic field strength of the wave 300. The counter wave 310 can travel along the opposite side of the chair 130 and in the same direction as the wave 300. The counter wave 310 may have a magnetic field strength that is less than the wave 300, and/or move at a rate that is less than the rate that the wave 300 moves across the electromagnetic array 155. In this regard, the counter wave 310 can gradually slow down (and eventually stop) the chair 130.

In some arrangements, the wave 300 can rotate the chair 130 by being controlled to apply a force to a portion (specifically a corner), but not all, of the chair 130. The wave 300 in this particular example causes the chair 130 to rotate according to which corner of the chair 130 the force is applied. A similar wave can be produced traveling in the opposite direction and applying a force on an opposite portion of the chair 130. When the chair 130 has sufficiently rotated, a counter wave can be produced that travels in the opposite direction and in contact with the opposite side of the same portion (e.g., opposite side of the same corner) of the chair 130. The counter wave may have a magnetic field strength that is less than the wave 300. As such, the chair 130 can gradually slow down, and stop rotating. While this example is provided as a way of rotating the chair 130, in some arrangements, the chair 130 may include a servo motor or some other rotational actuator that can rotate the seat 140 independent of the base 135 of the chair 130.

Although previously described as a single wave for clarity purposes, it is noted that, in some arrangements, the processor(s) 200 may produce a series of waves and counter waves. In these arrangements, the number and/or frequency of occurrence of such waves, as well as the particular parameters of each wave (e.g., rate of travel across the electromagnetic array 155, magnetic field strength, electromagnetic frequency, etc.) may be selected by the processor(s) 200 and/or array control module(s) 245 according to various factors and based on particular applications.

Referring back to FIG. 2, in one or more arrangements, the vehicle 100 can include an input system 250. The input system 250 can be any component or group of components operable to receive an input from a user. The input system 250 can be positioned, for example, on the chair 130. The input system 250 can in some examples be a set of keys, a joy stick, etc. The input system 250 can be used by the user to provide directional indications for the chair 130 to move. In this example, the user can set the target destination based on user inputs to the input system 250. In these and other arrangements, the array control module(s) 245 can determine where to direct the wave in the magnetic field based, at least in part, on the directional indications provided by the user via the input system 250.

In one example, the array control module(s) 245 can determine where to direct the wave based on the direction of acceleration identified by the acceleration identification module(s) 240. In this example, the chair 130 may already be located at the target destination set by the vehicle 100, the occupant, etc. The array control module(s) 245 can direct one or more wave(s) in the magnetic field so as to counter the acceleration identified by the acceleration identification module(s) 240. In this regard, the array control module(s) 245 can direct the electromagnetic wave(s) to impart a force on the chair 130, thereby countering the acceleration (and resulting inertial force) identified by the acceleration identification module(s) 240.

As described above, the sensor system 210 can include one or more chair position sensors 215. The chair position sensor(s) 215 can be any component or group of components operable to detect and/or assess the position and/or orientation of the chair 130 within the vehicle 100. The chair position sensor(s) 215 may be positioned on the chair 130 and/or at a location inside the vehicle 100. In some arrangements, the chair position sensor(s) 215 can include an IMU, gyroscope, accelerometer, etc. to detect changes in the position and/or orientation of the chair 130. The chair position sensor(s) 215 can, in some arrangements, detect a condition (e.g., current, load, voltage, flux, etc.) of each magnet 160 in the electromagnetic array 155. The chair position sensor(s) 215 can detect and/or assess the position and/or orientation of the chair 130 within the vehicle 100 based on changes in the condition of each magnet 160 in the electromagnetic array 155. In both arrangements, the chair position sensor(s) 215 can provide or otherwise generate data corresponding to the current location and/or position of the chair 130 within the vehicle 100. The chair position sensor(s) 215 can also detect changes in the current location and/or position of the chair 130 within the vehicle 100.

The chair position sensor(s) 215 can detect changes in the current location and/or position of the chair 130 with respect to the target destination. The array control module(s) 245 can identify electromagnetic waves to produce based on the location/position of the chair 130, changes in the location/position of the chair 130, the location/position of the chair 130 with respect to the target destination, etc. In this regard, the array control module(s) 245 can determine where to direct the wave in the magnetic field so as to maintain the chair 130 at the target destination. The array control module(s) 245 can determine where to direct the wave in the magnetic field to apply a force in the opposite direction as the direction that the chair 130 moves from the target destination.

In some examples, and as will be discussed in greater detail below, the automated control module(s) 235 can detect and/or predict an impending collision. The automated control module(s) 235 can detect and/or predict the impending collision based on, for example, current and/or future heading, speed, etc. of the vehicle 100, the location, heading, speed, etc. of any objects in the environment, etc. The automated control module(s) 235 can calculate a likelihood that the impending collision will occur based on these factors. In some arrangements, the automated control module(s) 235 can compare the likelihood of the impending collision occurring to a threshold. Where the likelihood of the impending collision meets (e.g., is greater than or equal to) the threshold, the array control module(s) 245 can determine a target destination so as to mitigate and/or prevent any injuries to an occupant of the chair 130 (e.g., a safe destination). The array control module(s) 245 can identify the safe area based on, for example, where the collision is occurring, the current location of the chair 130, etc. For example, the array control module(s) 245 can direct a wave that can cause the chair 130 to be re-located and/or re-positioned to the safe area. The array control module(s) 245, in this example, can direct a wave that can impart a force on the chair 130 that moves the chair 130 to the safe area.

Figure 4:
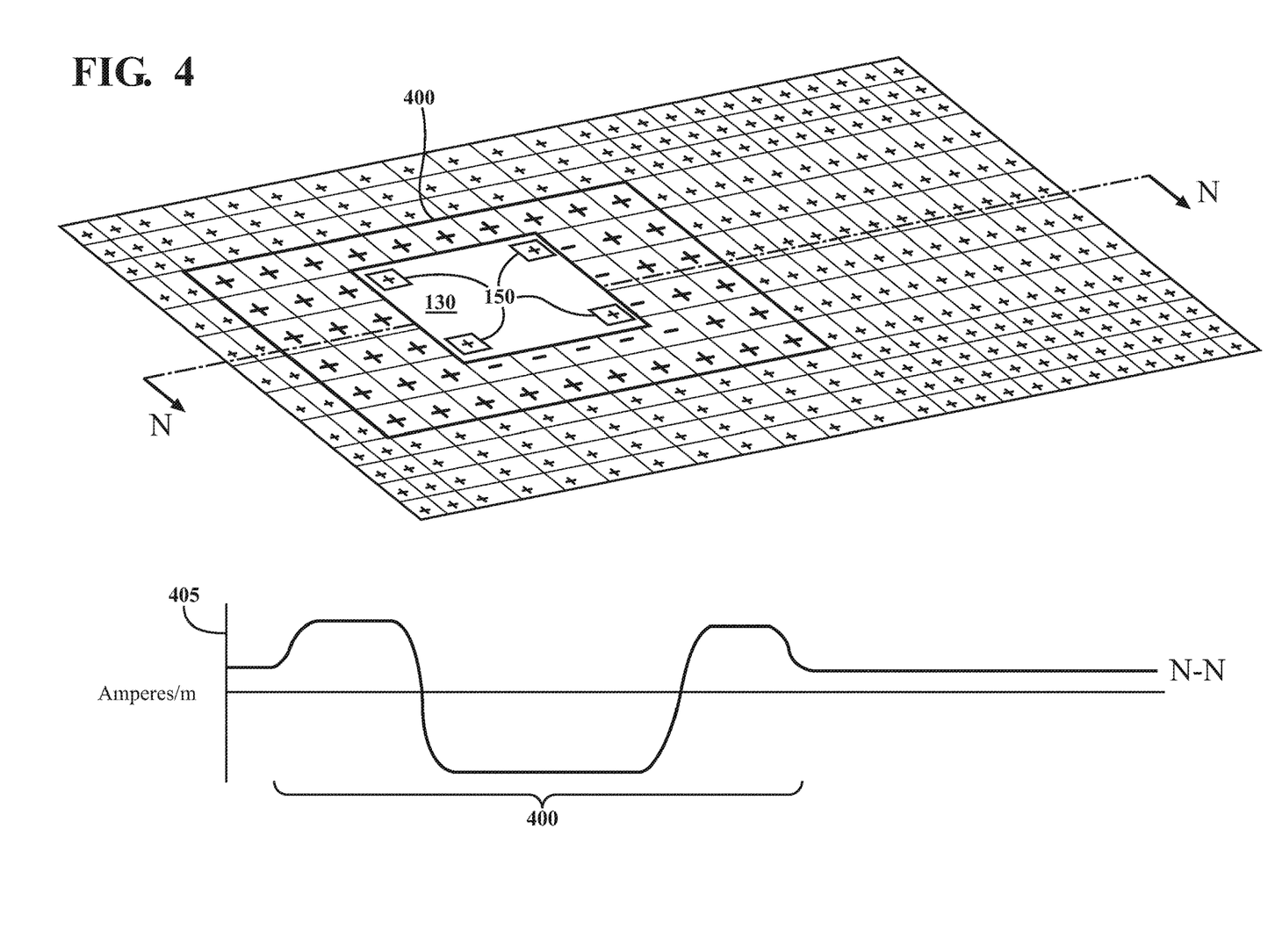

Referring now to FIG. 2 and FIG. 4, the array control module(s) 245 can include instructions to switch the polarity of at least some of the electromagnets 160 in the electromagnetic array 155. In some examples, the array control module(s) 245 can switch the polarity of at least some of the electromagnets 160 located underneath the base 135 while the chair 130 is at the target destination. The array control module(s) 245 can switch the polarity from having the opposite polarity as the polarity of the magnets 150 in the chair 130 (e.g., like poles on respective magnets are facing one another) to the electromagnets 160 having the same polarity (e.g., opposite poles on respective magnets are facing one another). As a result, the array control module(s) 245 can include instructions to switch the polarity of electromagnets 160 positioned underneath the chair 130 to cause the chair to be magnetically attached to the floor 110 of the vehicle 100. The array control module(s) 245 can switch the polarity of electromagnets 160 in response to detecting an impending collision.

In some arrangements, the array control module(s) 245 can both switch the polarity of electromagnets 160 underneath the chair 130, and maintain the polarity (e.g., like poles on respective magnets facing one another) in the area surrounding the chair 130 (e.g., the perimeter of the chair 130). The array control module(s) 245 can increase the magnetic field strength along the perimeter of the chair 130. In this regard, the array control module(s) 245 can magnetically attach the chair 130 to the floor 110 of the vehicle 100, and also produce an electromagnetic "bumper," or increased magnetic field strength inhibiting movement, in the profile of the magnetic field of the electromagnetic array 155. This can be best seen in FIG. 4. Such arrangements can further inhibit movement of the chair 130 within the vehicle 100 when such movement is unwanted or undesirable (such as when a collision is likely to occur, for example).

Specifically, in FIG. 4, the bumper 400 is shown in the magnetic field surrounding the chair 130. The magnetic field output by the electromagnetic array 155 is represented by positive symbols (e.g., south poles facing upwards), with an increased magnetic field strength surrounding the chair 130. While shown as localized, the magnetic field strength can be increased across the electromagnetic array 155. In this regard, the magnetic field can have a uniform magnetic field strength across the electromagnetic array 155 around the chair 130. Additionally, the magnetic field output by the electromagnets 160 positioned underneath the chair 130 is represented by negative symbols (e.g., north poles facing upwards). In this regard, the magnets 150 positioned on the chair 130 may be magnetically attracted to the electromagnets 160 positioned underneath the chair 130, and repulsed by the electromagnets 160 surrounding the chair. While each of these magnetic fields are represented by their respective polarity, the respective magnetic fields may have the opposite polarity. Accordingly, the present disclosure is not limited to either arrangement. However, in the example shown in FIG. 4, opposite poles should be facing one another on the respective magnets underneath the chair 130, thereby causing the chair 130 to be magnetically attached to the floor 110. Additionally, while the bumper 400 is described, in some arrangements, the polarity across the electromagnetic array 155 may be switched (e.g., opposite poles facing one another).

The control signal(s) for the electromagnetic array 155 can increase the magnetic field strength in particular areas, as represented by the graph 405. The graph 405 shows a profile of the magnetic field output by the electromagnetic array 155 defined by axis N-N. The control signal(s) can be transmitted from the processor(s) 200 to each of the electromagnets 160 in the electromagnetic array 155, thereby changing a profile of the magnetic field across the electromagnetic array 155.

Referring now to FIG. 2 and FIG. 5, the chair 130 can include a suspension system 500. Specifically, in FIG. 5, the suspension system 500 is shown and is operatively connected to the seat 140. The suspension system 500 can include any component or group of components operable to provide relative motion of the seat 140 with respect to the base 135. In some arrangements, the suspension system 500 can be constructed of a high permeability metal, such as MU-METAL® ASTM A753 Alloy 4, to reduce magnetic exposure to person(s) seated or otherwise positioned on the chair 130.

The suspension system 500 can be operatively connected to the processor(s) 200, among other components of the vehicle 100. The suspension system 500 can include one or more actuators 505, though four actuators 505 are shown in FIG. 5. The actuator(s) 505 can be, for example, linear motors, pneumatic actuators, etc. In the arrangement shown in FIG. 5, each the actuator(s) 505 can control a height of a respective corner of the seat 140. As a result, each of the actuator(s) 505 can be controlled to tilt the seat 140 in various directions.

In some arrangements, the suspension system 500 can include one or more of the chair position sensor(s) 215. The chair position sensor(s) 215 can provide data of the orientation and/or position of the chair 130, for example. The orientation and/or position of the chair 130 can be used as feedback for adjusting the orientation of the seat 140. Additionally or alternatively, the chair position sensor(s) 215 can detect any accelerations of the chair 130.

The vehicle 100 can include one or more seat control modules 255. The seat control module(s) 255 can include instructions to generate seat control signals for the suspension system 500 that cause the suspension system 500 to tilt the seat 140 of the chair 130. In some arrangements, the seat control module(s) 255 can tilt the seat 140 according to user input (for example, via adjustments on the input system 250). In other arrangements, the seat control module(s) 255 can tilt the seat according to one or more accelerations of the vehicle 100 (as detected by, for example, the acceleration identification module(s) 240 and/or the chair position sensor(s) 215). The seat control module(s) 255 can tilt the seat 140 as the vehicle 100 accelerates so as to counter inertial forces on an occupant in the seat 140. In this regard, the seat control module(s) 255 can tilt the seat 140 to counter inertial forces on the occupant in the seat 140, and the array control module(s) 245 can produce waves in the magnetic field to counter inertial forces on the chair 130 that would cause the chair 130 to move. In some arrangements, the seat control module(s) 255 can tilt the seat 140 towards the direction of acceleration as the vehicle 100 accelerates. As a result, a normal force of the seat 140 can have a directional component that, at least in part, counters the inertial force on the occupant in the seat 140.

Figure 6:
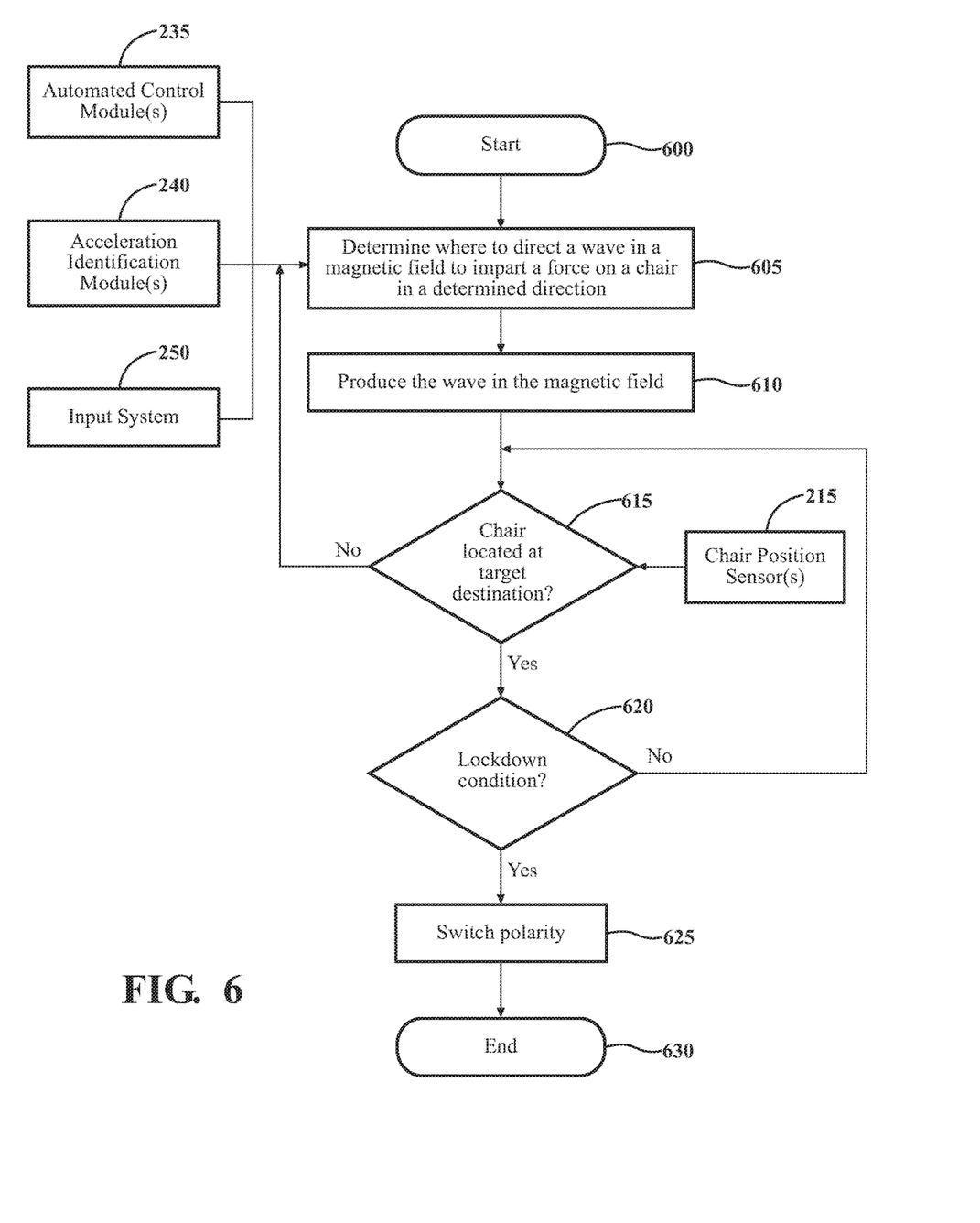
FIG. 6 shows an example method of controlling a chair in a vehicle.

Referring now to FIG. 6, an example method of controlling a chair in a vehicle is shown. The flowchart shown in FIG. 6 is only for exemplary purposes. The following disclosure should not be limited to each and every function block shown in FIG. 6. To the contrary, the method does not require each and every function block shown. In some examples, the method may include additional function blocks. Further, the method does not need to be performed in the same chronological order shown in FIG. 6.

The method can begin at starting block 600. In some arrangements, the method can begin when the vehicle 100 is turned on, is in drive, neutral, reverse, etc. In some arrangements, the method can begin when an occupant is positioned on the chair 130. In other arrangements, the method can begin when the chair 130 is levitating (e.g., the electromagnetic array 155 is being controlled to output a magnetic field where like poles are facing one another on respective magnets 150, 160). The method can proceed to function block 605.

At function block 605, the array control module(s) 245 can include instructions to identify a target destination. The array control module(s) 245 can determine where to direct a wave in the magnetic field output by the electromagnetic array 155 based on the target destination. The wave can impart a force on the chair 130. In some arrangements, the array control module(s) 245 can determine a direction to impart a force on the chair 130 to cause the chair 130 to be located at the target destination.

The target destination may be a position, location, and/or orientation set for the chair 130 within the vehicle 100. In some examples, the target destination may be a location of the chair 130 that mitigates the likelihood of injury to an occupant of the chair 130. In other examples, the target destination may be a location within the vehicle 100 that mitigates the amount of acceleration experienced by the occupant of the chair 130. In still other examples, the target destination may be a location within the vehicle 100 that is set and/or directed to by an occupant of the vehicle 100. The target destination may be different from the current position, location, and/or orientation of the chair 130 within the vehicle 100, or the target destination may be the current position, location, and/or orientation of the chair 130 within the vehicle 100. As shown, the array control module(s) 245 can receive inputs from, for example, the automated control module(s) 235, the acceleration identification module(s) 240, the input system 250, and/or other components of the disclosed system.

The array control module(s) 245 can determine where to direct a wave in the magnetic field to impart a force on the chair 130 based on the inputs provided by the automated control module(s) 235, the acceleration identification module(s) 240, the input system 250, etc. The wave may have a magnetic field strength, frequency, and/or move across the electromagnetic array 155 at a rate that is a function of the force desired to be applied to the chair 130. Where a target destination is provided to the array control module(s) 245, the array control module(s) 245 can determine where to direct a wave in the magnetic field to impart a force on the chair 130, causing the chair 130 to move towards the target destination. However, and as discussed in greater detail below, where the chair 130 is already located at the target destination and begins to move away from the target destination, the array control module(s) 245 can determine where to direct a wave in the magnetic field to impart a force on the chair 130 that causes the chair to move back towards the target destination. The method can continue to function block 610.

At function block 610, the array control module(s) 245 can include instructions to generate one or more control signals for the electromagnetic array 155. The one or more control signals can be communicated to individual electromagnets 160 in the electromagnetic array 155. The one or more control signals can cause the magnetic field strength of one or more individual electromagnets 160 to change. In some arrangements, the one or more control signals can cause the magnetic field strength to change in portions of the electromagnetic array 155. As a result, a profile of the magnetic field across the electromagnetic array 155 can change. The wave can move along the direction determined at function block 605. The wave can move in the determined direction starting from the current position of the chair 130 towards the target destination. The wave can lift a portion of the chair 130 (by imparting a force on magnets 150 of the chair 130), thereby causing the chair 130 to tilt in the direction and be carried by the wave. The method can continue to decision block 615.

At decision block 615, the array control module(s) 245 can include instructions to determine whether the chair 130 is located at the target destination set by the user via the input system 250, the automated control module(s) 235, etc. The array control module(s) 245 can receive inputs from, for example, the chair position sensor(s) 215 to determine the current location of the chair 130. The array control module(s) 245 can compare the current location of the chair 130 to the target destination. If the current location of the chair 130 is the same as the target destination, the method can continue to decision block 620. However, if the current location of the chair 130 is not the same as the target destination, the method can continue back to function block 605, where the array control module(s) 245 determines where to direct a wave to impart a force on the chair to move the chair 130 towards the target destination.

At decision block 620, the array control module(s) 245 and/or the automated control module(s) 235 can include instructions to determine whether there is a lockdown condition. As described above, a lockdown condition may occur when, for example, the likelihood of a collision meets a threshold (e.g., is greater than or equal to). The automated control module(s) 235 can monitor the external environment and determine, based on the current heading, speed, etc. of the vehicle 100, current location, heading, speed, etc. of other objects, etc., a likelihood of a collision with any of the other objects. Based on a comparison of the likelihood of a collision to the threshold, the array control module(s) 245 and/or the automated control module(s) 235 can determine whether there is a lockdown condition. If there is a lockdown condition, the method can continue to function block 630. However, if there is not a lockdown condition, the method can continue back to decision block 615, where the array control module(s) 245 determines whether the chair 130 is located at the target destination.

At function block 630, when a lockdown condition exists, the array control module(s) 245 can include instructions to switch a polarity of one or more electromagnets 160 in the electromagnetic array 155. The array control module(s) 245 can switch the polarity from like poles on respective magnets being towards each other to opposite poles on respective magnets being towards each other. In switching the polarity, the chair 130 may be magnetically attached to the floor 110 of the vehicle 100 via the electromagnets 160 in the electromagnetic array 155. In some arrangements, the array control module(s) 245 can maintain the polarity of electromagnets 160 in the electromagnetic array 155 around the perimeter of the base 135 of the chair 130. The method can continue to ending block 635.

The method can end at ending block 635. The method can end when, for example, the chair 130 is no longer levitating. The chair 130 may no longer be levitating as a result of a lockdown condition, when an occupant departs from the chair 130, etc.

It should be noted that, while the steps of this method are described as sequential, one or more of the steps can be performed simultaneously, in different sequential steps, etc. For example, in some arrangements, the array control module(s) 245 may always be monitoring for the existence of a lockdown condition and, if a lockdown condition exists, the array control module(s) 245 may switch the polarity of one or more electromagnets 160 in the electromagnetic array 155. In this regard, in some arrangements, the existence of a lockdown condition may serve as an interrupt.

FIG. 2 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more examples, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more examples, the vehicle 100 is highly automated or completely automated. In one example, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a path. In one or more arrangements, the vehicle 100 is configured one or more semi-autonomous operational modes in which one or more computing systems control one or more components of the vehicle 100 to cause the vehicle 100 to follow a modified path deviating from the current path being followed by the vehicle operator. In this example, the one or more computing systems control one or more components of the vehicle 100 to cause the vehicle 100 to follow a modified path responsive to determining a deviation from the current path being followed by the vehicle operator.

In one or more arrangements, the memory 205 can include map data. The map data can include maps of one or more geographic areas. In some instances, the map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can be high quality and/or highly detailed.

In one or more arrangements, the map data can include one or more terrain maps. The terrain map(s) can include information about the ground, terrain, roads, surfaces, and/or other features of one or more geographic areas. The terrain map(s) can include elevation data in the one or more geographic areas. The map data can be high quality and/or highly detailed. The terrain map(s) can define one or more ground surfaces, which can include paved roads, unpaved roads, land, and other things that define a ground surface.

In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills, etc. The static obstacles can be objects that extend above ground level. The one or more static obstacles included in the static obstacle map(s) can have location data, size data, dimension data, material data, and/or other data associated with it. The static obstacle map(s) can include measurements, dimensions, distances, and/or information for one or more static obstacles. The static obstacle map(s) can be high quality and/or highly detailed. The static obstacle map(s) can be updated to reflect changes within a mapped area.

The memory 205 can include sensor data. In this context, "sensor data" means any information about the sensors that the vehicle 100 is equipped with, including the capabilities and other information about such sensors. As will be explained below, the vehicle 100 can include the sensor system 210. The sensor data can relate to one or more sensors of the sensor system 210.

In some instances, at least a portion of the map data and/or the sensor data can be located in memory 205 located onboard the vehicle 100. Alternatively, or in addition, at least a portion of the map data and/or the sensor data can be located in memory 205 that is located remotely from the vehicle 100.

As noted above, the vehicle 100 can include the sensor system 210. The sensor system 210 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 210 includes a plurality of sensors, the sensors can work independently from each other. Alternatively, two or more of the sensors can work in combination with each other. In such case, the two or more sensors can form a sensor network. The sensor system 210 and/or the one or more sensors can be operatively connected to the processor(s) 200, the memory 205, and/or another element of the vehicle 100 (including any of the elements shown in FIG. 2). The sensor system 210 can acquire data of at least a portion of the external environment of the vehicle 100 (e.g., the present context).

The sensor system 210 can include any suitable type of sensor. Various examples of different types of sensors will be described herein. However, it will be understood that the examples are not limited to the particular sensors described. The sensor system 210 can include one or more vehicle sensors 220. The vehicle sensor(s) 220 can detect, determine, and/or sense information about the vehicle 100 itself. In one or more arrangements, the vehicle sensor(s) 220 can be configured to detect, and/or sense position and orientation changes of the vehicle 100, such as, for example, based on inertial acceleration. In one or more arrangements, the vehicle sensor(s) 220 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 220 can be configured to detect, and/or sense one or more characteristics of the vehicle 100. In one or more arrangements, the vehicle sensor(s) 220 can include a speedometer to determine a current speed of the vehicle 100.

Alternatively, or in addition, the sensor system 210 can include one or more external environment sensors 225 configured to acquire, and/or sense driving environment data. "Driving environment data" includes and data or information about the external environment in which an autonomous vehicle is located or one or more portions thereof. For example, the external environment sensor(s) 225 can be configured to detect, quantify and/or sense obstacles in at least a portion of the external environment of the vehicle 100 and/or information/data about such obstacles. Such obstacles can be stationary objects and/or dynamic objects. The external environment sensor(s) 225 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the external environment sensor(s) 225 can capture data corresponding to the relative position, location, speed, heading, etc. of the obstacle(s) in the as compared to the current position, location, speed, heading, etc. of the vehicle 100.

Various examples of sensors of the sensor system 210 will be described herein. The example sensors can be part of the one or more external environment sensors and/or the one or more vehicle sensors. However, it will be understood that the examples are not limited to the particular sensors described.

As an example, in one or more arrangements, the sensor system 210 can include one or more radar sensors, one or more LIDAR sensors, one or more sonar sensors, and/or one or more cameras. In one or more arrangements, the one or more cameras can be high dynamic range (HDR) cameras or infrared (IR) cameras. In one or more arrangements, the one or more cameras can be hyperspectral cameras.

The vehicle 100 can include an input/output (I/O) system. An "input system" includes any device, component, system, element or arrangement or groups thereof that enable information/data to be entered into a machine. The input system can receive an input from a vehicle occupant (e.g. a driver or a passenger). An "output system" includes any device, component, or arrangement or groups thereof that enable information/data to be presented to a vehicle occupant (e.g. a person, a vehicle passenger, etc.). The input system and output system can together make up the I/O system.

The vehicle 100 can include one or more vehicle systems 260. While various examples of the vehicle system(s) 260 are described herein, the vehicle 100 can include more, fewer, or different vehicle system(s) 260. It should be appreciated that although particular vehicle system(s) 260 are separately defined, each or any of the vehicle system(s) 260 or portions thereof can be otherwise combined or segregated via hardware and/or software within the vehicle 100. The vehicle 100 can include a propulsion system, a braking system, a steering system, throttle system, a transmission system, a signaling system, and/or a navigation system. Each of these systems can include one or more devices, components, and/or combination thereof, now known or later developed.

The navigation system can include one or more devices, applications, and/or combinations thereof, now known or later developed, configured to determine the geographic location of the vehicle 100 and/or to determine a travel route for the vehicle 100. The navigation system can include one or more mapping applications to determine a path for the vehicle 100. The navigation system can include a global positioning system, a local positioning system or a geolocation system.

As noted above, the vehicle 100 can include module(s) 230, at least some of which are described herein. The module(s) 230 can be implemented as computer-readable program code that, when executed by the processor(s) 200, implement one or more of the various processes described herein. One or more of the module(s) 230 can be a component of the processor(s) 200, or one or more of the module(s) 230 can be executed on and/or distributed among other processing systems to which the processor(s) 200 is operatively connected. The module(s) 230 can include instructions (e.g., program logic) executable by one or more processor(s) 200. Alternatively, or in addition, the memory 205 can contain such instructions.

In one or more arrangements, one or more of the module(s) 230 described herein can include artificial or computational intelligence elements, e.g., neural network, fuzzy logic or other machine learning algorithms. Further, in one or more arrangements, one or more of the module(s) 230 can be distributed among a plurality of the module(s) 230 described herein. In one or more arrangements, two or more of the module(s) 230 described herein can be combined into a single module.

As stated above, the vehicle 100 can include the automated control module(s) 235. The automated control module(s) 235 can communicate with the various vehicle system(s) 260. In one or more arrangements, the processor(s) 200 and/or automated control module(s) 235 can be operatively connected to communicate with the various vehicle system(s) 260 and/or individual components thereof. For example, returning to FIG. 2, the processor(s) 200 and/or the automated control module(s) 235 can be in communication to send and/or receive information from the various vehicle system(s) 260 to control the movement, speed, maneuvering, heading, direction, etc. of the vehicle 100. The processor(s) 200 and/or the automated control module(s) 235 can control some or all of these vehicle system(s) 260 and, thus, the vehicle 100 can be partially or fully autonomous.

The processor(s) 200 and/or the automated control module(s) 235 can control the navigation and/or maneuvering of the vehicle 100 by controlling one or more of the vehicle system(s) 260 and/or components thereof. For instance, when operating in an autonomous or semi-autonomous mode, the processor(s) 200 and/or the automated control module(s) 235 can control the direction and/or speed of the vehicle 100. The processor(s) 200 and/or the automated control module(s) 235 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 100 can include one or more vehicle actuators. The vehicle actuator(s) can be any element or combination of elements operable to modify, adjust and/or alter one or more of the vehicle system(s) 260 or components thereof responsive to receiving vehicle control signals or other inputs from the processor(s) 200 and/or the automated control module(s) 235. Any suitable actuator can be used. For instance, the one or more vehicle actuators can include motors, pneumatic actuators, hydraulic pistons, relays, solenoids, and/or piezoelectric actuators, just to name a few possibilities.

The automated control module(s) 235 can receive data from the sensor system 210 and/or any other type of system capable of capturing information relating to the vehicle 100 and/or the external environment of the vehicle 100. In one or more arrangements, the automated control module(s) 235 can use such data to generate one or more driving scene models. The automated control module(s) 235 can determine position and velocity of the vehicle 100. The automated control module(s) 235 can determine the location, position, speed, heading, etc. of obstacles, or other environmental features including traffic signs, trees, shrubs, neighboring vehicles, pedestrians, etc.

The automated control module(s) 235 can receive, and/or determine location information for obstacles (e.g., the vehicle 100) within the external environment of the vehicle 100 for use by the processor(s) 200, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated control module(s) 235 can determine path(s), current autonomous driving maneuvers for the vehicle 100, future autonomous driving maneuvers and/or modifications to current autonomous driving maneuvers based on data acquired by the sensor system 210, driving scene models, and/or data from any other suitable source.

In one or more arrangements, based on the current position, location, speed, heading, etc. of the vehicle 100 as compared to the relative position, location, speed, heading, etc. of the obstacles located in the external environment, the automated control module(s) 235 can determine a likelihood of collision. The automated control module(s) 235 may predict, assess, map, and/or determine a trajectory of the vehicle 100, trajectory of the obstacles, etc. The automated control module(s) 235 may determine, based on the relative trajectories, a likelihood of collision with any of the obstacles in the external environment.

The automated control module(s) 235 can determine one or more driving maneuvers to follow the selected path for the vehicle 100. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. Some driving maneuvers may be used to implement a determined trajectory for the vehicle 100, to mitigate damage to the vehicle 100 in the event of a likely collision (e.g., likelihood of collision meets a threshold likelihood), to overtake a current course or trajectory being followed by a driver of the vehicle 100, etc. The automated control module(s) 235 can be configured can implement the determined driving maneuvers. The automated control module(s) 235 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 235 can execute various vehicle functions and/or to transmit data to, receive data from, interact with, and/or control the vehicle 100 or one or more systems thereof (e.g. one or more of the vehicle system(s) 260).

Detailed examples are disclosed herein. However, it is to be understood that the present disclosure is only intended for purposes of providing examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-5, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A seating system in a vehicle, comprising:
    a floor featuring an electromagnetic array configured to output a magnetic field having a first polarity;
    a chair including a base adjacent to the floor, the base featuring one or more magnets configured to have a shared second polarity that is opposite the first polarity;
    a processor operatively connected to the electromagnetic array; and
    memory operatively connected to the processor, the memory storing:
        an array control module including instructions that, when executed by the processor, cause the processor to i) determine where to direct a wave in the magnetic field to impart a force on the chair in a determined direction, and ii) generate one or more control signals for the electromagnetic array to produce the wave in the magnetic field that moves across the electromagnetic array in the determined direction and thereby imparts the force on the chair via the one or more magnets in the determined direction.

2. The seating system of claim 1, wherein the chair further includes a seat and a suspension system operatively connected to the seat.

3. The seating system of claim 2, wherein the memory further stores:
    a seat control module including instructions that, when executed by the processor, cause the processor to generate one or more control signals for the suspension system to tilt the seat according to an acceleration of the vehicle.

4. The seating system of claim 3, wherein the seat is tilted towards the acceleration of the vehicle.

5. The seating system of claim 1, wherein the array control module further includes instructions that, when executed by the processor, cause the processor to generate one or more additional control signals for at least some electromagnets in the electromagnetic array located underneath the chair to switch from the first polarity to the second polarity and thereby magnetically attach the chair via the one or more magnets to the floor.

6. The seating system of claim 5, wherein the at least some electromagnets located underneath the chair switch from the first polarity to the second polarity in response to a detected impending collision.

7. The seating system of claim 5, wherein the array control module further includes instructions that, when executed by the processor, cause the processor to generate one or more additional control signals for at least some electromagnets in the electromagnetic array located around the chair to maintain the first polarity.

8. The seating system of claim 1, wherein the array control module further includes instructions that, when executed by the processor, cause the processor to determine where to direct the wave to impart the force on the chair in the determined direction based on input from an occupant of the chair.

9. The seating system of claim 1, wherein the array control module further includes instructions that, when executed by the processor, cause the processor to determine where to direct the wave to impart the force on the chair in the determined direction based on one or more accelerations of the vehicle.

10. The seating system of claim 1, wherein the array control module further includes instructions that, when executed by the processor, cause the processor to determine where to direct the wave to impart the force on the chair in the determined direction based on a detected impending collision.

11. The seating system of claim 1, wherein the array control module further includes instructions that, when executed by the processor, cause the processor to generate one or more additional control signals for the electromagnetic array to produce a counter wave in the magnetic field that moves across the electromagnetic array in the determined direction along an opposite side of the base as the wave and thereby imparts a force on the chair via the one or more magnets causing the chair to slow down.

12. The seating system of claim 1, wherein the wave has a varying magnetic field strength across the wave and thereby imparts a rotating force on the chair via the one or more magnets according to the varying magnetic field strength.

13. The seating system of claim 1, wherein the array control module includes instructions that, when executed by the processor, cause the processor to produce successive waves in the magnetic field that move across the electromagnetic array in the determined direction and thereby imparts successive forces on the chair via the one or more magnets in the determined direction.

14. A method of controlling a chair in a vehicle, the method comprising:
in a vehicle including a chair and a floor featuring an electromagnetic array, levitating the chair above the electromagnetic array using a magnetic field output by the electromagnetic array;
identifying a target destination for the chair within the vehicle; and
generating one or more waves in the magnetic field, the one or more waves moving towards the target destination, thereby imparting a force on the chair causing the chair to be located at the target destination.

15. The method of claim 14, wherein identifying the target destination comprises receiving one or more inputs from an occupant of the chair.

16. The method of claim 14, further comprising:
in response to the chair being located at the target destination, detecting one or more changes from the target destination.

17. The method of claim 16, wherein the one or more waves include one or more waves moving opposite the detected one or more changes from the target destination, thereby causing the chair to be re-located at the target destination.

18. The method of claim 14, further comprising:
detecting an impending collision.

19. The method of claim 18, wherein the target destination is a safe destination with respect to the impending collision.

20. The method of claim 18, further comprising:
in response to detecting the impending collision, switching a polarity of a portion of the magnetic field positioned beneath the chair to thereby magnetically attach the chair to the floor.

* * * * *